United States Patent [19]
Jacob

[11] Patent Number: 4,593,412
[45] Date of Patent: Jun. 3, 1986

[54] INTEGRATED OSCILLATOR ANTENNA FOR LOW POWER, LOW HARMONIC RADIATION

[75] Inventor: Keith Jacob, Ann Arbor, Mich.

[73] Assignee: Multi-Elmac Company, Novi, Mich.

[21] Appl. No.: 612,393

[22] Filed: May 21, 1984

[51] Int. Cl.<sup>4</sup> ............................................. H04B 1/04
[52] U.S. Cl. ...................................... 455/129; 455/99; 343/793; 343/820
[58] Field of Search ................... 455/95, 121, 129, 99; 340/696; 343/820, 822, 702, 793

[56] References Cited
U.S. PATENT DOCUMENTS

| | | | |
|---|---|---|---|
| 2,035,456 | 3/1936 | Blair et al. | 455/121 |
| 2,091,663 | 8/1937 | Walden | 455/121 |
| 3,228,030 | 1/1966 | Moore | 455/129 |
| 3,651,405 | 3/1972 | Whitney et al. | 455/129 |
| 3,875,513 | 4/1975 | Strull et al. | 455/129 |
| 4,004,228 | 1/1977 | Mullett | 455/129 |

Primary Examiner—Jin F. Ng
Attorney, Agent, or Firm—Krass & Young

[57] ABSTRACT

A low-power transmitter for garage door operator systems and the like wherein harmonics of the fundamental frequency are suppressed by class A or AB oscillator operation and fundamental radiation is enhanced by way of a combined inductor/radiator having conductive printed circuit extrusions on the ends thereof to effectively form a center-fed dipole antenna.

2 Claims, 3 Drawing Figures

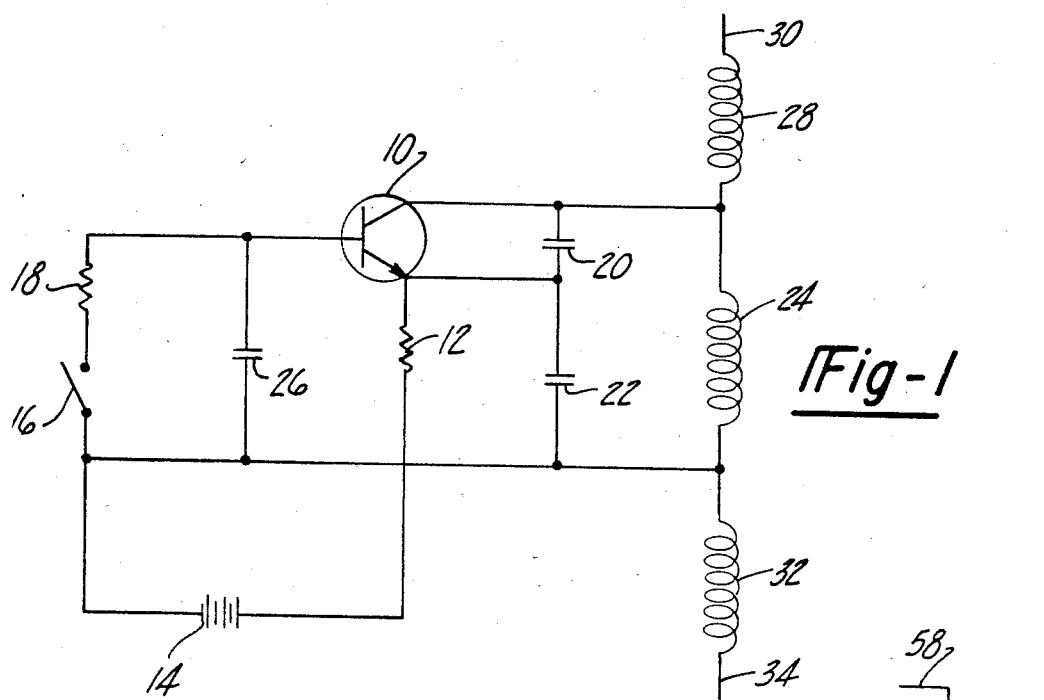
*Fig-1*
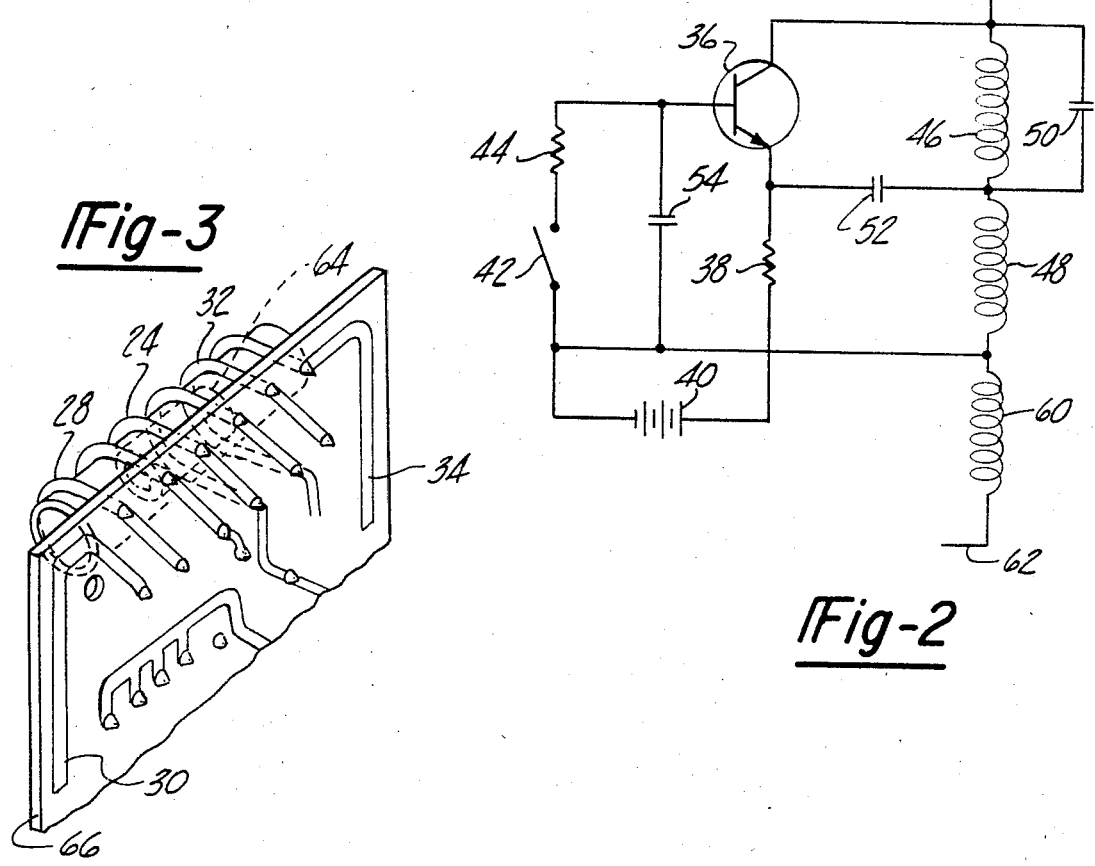
*Fig-3*
*Fig-2*

INTEGRATED OSCILLATOR ANTENNA FOR LOW POWER, LOW HARMONIC RADIATION

INTRODUCTION

This invention relates to radio frequency transmitters and more particularly to a low-power transmitter exhibiting improved harmonic suppression and increased fundamental frequency radiation strength.

BACKGROUND OF THE INVENTION

Radio frequency transmitters are often used in garage door operators and security systems to transmit a coded signal to a receiver-operator combination which actuates a motor to raise a garage door or move a gate. Such transmitters are subject to regulation by government agencies including the Federal Communications Commission which sets standards for the level of high-frequency harmonic signal radiation which any given transmitter is permitted to radiate. As a result of current or anticipated regulations which require increased harmonic suppression, there exists an interest in advancing the state of the art of the low powered hand held transmitter.

One approach to suppressing or reducing the intensity of harmonic radiation is to reduce the intensity or power level of the transmitter as a whole. This of course is undesirable from the standpoint of the user since it substantially reduces the effectiveness of a garage door operator by requiring the user to be extremely close to the target receiver and quite possibly to be outside of his own automobile when the transmitter is operated.

SUMMARY OF THE INVENTION

The present invention provides a low-powered radio frequency signal transmitter having a high ratio of fundamental to harmonic frequency output while at the same time being subject to inexpensive lightweight implementation and with reasonable output power level. In general this is accomplished by configuring the oscillator portion of the transmitter to run either Class A or AB and through the use of an integral tank circuit/radiator inductor having extended end sections to form an effectively larger center fed dipole antenna which is preferably tuned to radiate at the fundamental frequency. In the preferred embodiment the inductor end sections include autotransformer inductor elements to minimize harmonic coupling and maximize the fundamental frequency radiation.

BRIEF DESCRIPTION OF THE DRAWING

FIG. I is a schematic circuit diagram of a transmitter using a Colpitts oscillator, FIG. 2 is a schematic circuit diagram of a transmitter utilizing a Hartley oscillator, and FIG. 3 is a detailed drawing of the tank circuit inductor/radiator element of the Colpitts oscillator of FIG. 1 indicating the layout of certain printed circuit components on a printed circuit board.

DETAILED DESCRIPTION OF THE ILLUSTRATIVE EMBODIMENTS

Referring now to FIG. 1 a low-powered battery operated RF transmitter using the Colpitts oscillator design as shown to comprise an npn transistor 10 the base-emitter circuit of which includes an emitter resistor 12 a nine volt battery 14, push button switch 16 and a base resistor 18. The tank circuit comprises tuning capacitors 20 and 22 connected as a voltage divider; capacitor 20 is connected across the collector-emitter circuit of the transistor 10 and capacitor 22 is connected between the emitter and the feedback capacitor 26. The tank circuit further comprises an integrated inductor/radiator 24. The tank circuit comprising capacitors 20 and 22 and the inductor 24 is preferably tuned to resonate at the fundamental frequency of 300 megahertz.

The components including the feedback capacitor 26 are preferably chosen such that the oscillator circuit of FIG. 1 operates Class or Class AB to reduce harmonic output. In addition, the inductor 24 exhibits upper and lower extension sections 28 and 32, section 28 comprising several turns of inductor and an elongated dipole antenna extension 30 in the form of a open-ended length of conductor such as printed circuit board conductor metal. End section 32 further comprises an inductor portion of several turns and an antenna extension 34. The antenna extensions 30 and 34 together effectively form a center fed dipole antenna or radiator the length of which is physically substantially longer than the antenna length provided by inductor 24 alone. This increased antenna length substantially increases the output level of the fundamental frequency while at the same time the conductor portions 24, 28 and 32 act as a choke to further reduce or suppress harmonic radiation.

Inductor sections 28 and 32 are linked in the fashion of auto transformers with the inductor section 24 to minimize harmonic coupling into the radiator extensions; i.e. to enhance the choke action.

FIG. 2 illustrates the implementation of the invention using a Hartley oscillator. The circuit of FIG. 2 comprises the transistor 36 the emitter base circuit of which includes emitter resistor 38, nine volt battery 40, push button switch 42 and base resistor 44. An inductor/radiator 46 having a center tap 48 is connected to receive the oscillator output and operates in conjunction with a parallel connected capacitor 50 to form a tank circuit which is preferably tuned to resonate at the fundamental 300 megahertz frequency. The lower end of the inductor/radiator is connected back to the input circuit of the transistor 36 by way of a feedback capacitor 54. The emitter circuit of the transistor 36 is connected to the center tap 48 of the inductor/radiator 46 by way of coupling capacitor 52.

As was the case with the embodiment of FIG. 1, the radiator/inductor 46 has an extension at one end comprising inductor section 56 and antenna extension 58. At the other end the invention exhibits inductor 60 and antenna extension 62. Again the extension sections 56 and 60 are inductively linked with the inductor 46 acting as a primary to enhance the harmonic suppression through inductor choke action.

As best shown in FIG. 3 the inductor which is selected as inductor 24 from the Colpitts oscillator circuit of FIG. 1 strictly by way of example, is preferably layed out on a printed circuit board 66 with the open-ended extensions 28 and 32 connected directly to the antenna extensions 30 and 34 respectively. The inductor section 24 is preferably formed as large turns of relatively stiff wire which support a slug-type tuning section 64 therewithin. The inductors 24, 28 and 32 are all formed by U-shaped wire loops which are conductively linked by printed circuit legs. The extension 30 and 34 are also printed on the board 66 adjacent the periphery thereof and are tuned by means of a scalpel or knife by trimming off end pieces until the proper operation is achieved.

By way of example only the following component values for the elements in the circuits of FIGS. 1 and 2 are given:

Transistor 10, 36—MPS-H10
Battery 14, 40—9 volt
Resistor 18, 44—220 K OHM
Capacitor 26, 54—1 pfd.
Cap 20, 22—10 pfd.
Capacitor 50—5 pfd.
Inductor 24, 46—0.06 $\mu$H
Capacitor 42—100 pfd.
Fundamental Freq.—300 mHz
Inductor 28,32,58,60—0.05 to 0.10 $\mu$H

I claim:

1. In a radio transmitter of the type which includes an oscillator having a tank circuit and an inductor in the tank circuit serving as an antenna element and having first and second ends, first and second antenna inductors each having first and second ends with the first ends of the first and second antenna inductors respectively coupled to the first and second ends of the tank circuit inductor, the second ends of the first and second antenna inductors being connected to a respective antenna conductor with an open terminal end forming a center-fed dipole antenna.

2. Apparatus as defined in claim 1 further including a printed circuit board, all of said antenna-conductors and at least portions of said tank circuit inductor and first and second antenna-inductors being printed on said printed circuit board.

* * * * *